US00RE37061E

(19) United States
(12) Reissued Patent
Stokoe et al.

(10) Patent Number: US RE37,061 E
(45) Date of Reissued Patent: Feb. 20, 2001

(54) METHOD OF DISTRIBUTING LOADS GENERATED BETWEEN A SHIP AND A SUPPORTING DRY DOCK

(75) Inventors: Geoffrey Atrill Stokoe; George Montague Green; Iver Duane Cayocca, all of Miami, FL (US)

(73) Assignee: Syncrolift, Inc., Miami, FL (US)

(21) Appl. No.: 09/198,332

(22) Filed: Nov. 24, 1998

Related U.S. Patent Documents

Reissue of:
(64) Patent No.: 5,314,263
Issued: May 24, 1994
Appl. No.: 07/717,011
Filed: Jun. 18, 1991

(51) Int. Cl.[7] ..... B63C 1/00
(52) U.S. Cl. ..... 405/1; 114/48; 405/3; 414/678
(58) Field of Search ..... 405/1–7; 114/44–48; 254/89 R; 414/678

(56) References Cited

U.S. PATENT DOCUMENTS

| | | | | |
|---|---|---|---|---|
| 2,401,878 | | 6/1946 | McClain . | |
| 3,073,125 | * | 1/1963 | Pearlson | 405/3 |
| 3,289,868 | | 12/1966 | Miller . | |
| 3,327,997 | * | 6/1967 | Zenke | 254/89 R |
| 3,429,288 | | 2/1969 | Suit . | |
| 3,777,691 | | 12/1973 | Beale . | |
| 3,916,811 | | 11/1975 | Fromnick . | |
| 4,053,138 | | 10/1977 | Mattson . | |
| 4,087,979 | * | 5/1978 | Pearlson | 405/3 |
| 4,251,974 | | 2/1981 | Vanderklaauw . | |
| 4,329,082 | * | 5/1982 | Gillis | 405/3 |
| 4,661,749 | | 4/1987 | Finkbeiner . | |
| 4,686,920 | | 8/1987 | Thomas . | |
| 4,763,592 | | 8/1988 | Russ . | |
| 5,020,463 | | 6/1991 | Franklin . | |
| 5,051,027 | | 9/1991 | Horton . | |

FOREIGN PATENT DOCUMENTS

| | | | | |
|---|---|---|---|---|
| 2132142 | * | 1/1973 | (DE) | 405/3 |
| 3629244 | | 3/1987 | (DE) . | |
| 0082677 | * | 6/1983 | (EP) | 405/3 |
| 58-36998 | | 3/1983 | (JP) . | |
| 468833 | * | 12/1975 | (SU) | 405/3 |

OTHER PUBLICATIONS

Letter, May 1, 1986 From Hydraudyne Systems & Engineering B.V. to a Mr. Michael Pomeroy (14 pages).
Letter, May 23, 1989 From Hydraudyne Systems & Engineering B.V. to a Mr. Michael Pomeroy (17 pages).
Hydraudyne Document dated Apr. 12, 1989 (4 pages).
Excerpt, Luzon Shiplift Manual, undated (1 page).

* cited by examiner

*Primary Examiner*—Dennis L. Taylor
(74) *Attorney, Agent, or Firm*—Pillsbury Madison & Sutro LLP

(57) ABSTRACT

A method of distributing the loads generated between a ship and a supporting dry dock which comprises a platform comprising a number of articulatedly joined sub platforms and connected for lifting/lowering by opposed pairs of hoist winches, comprises moving certain combinations of the sub platforms by activating appropriate hoist winches, so as to alter forces to portions of the ship's hull, which forces may be evenly distributed, or concentrated so as to change the shape of local portions of the ship, or bring into alignment hatches and their covers.

4 Claims, 5 Drawing Sheets

METHOD OF DISTRIBUTING LOADS GENERATED BETWEEN A SHIP AND A SUPPORTING DRY DOCK

Matter enclosed in heavy brackets [ ] appears in the original patent but forms no part of this reissue specification; matter printed in italics indicates the additions made by reissue.

FIELD OF THE INVENTION

The present invention relates to a method of distributing the loads generated between a ship and a supporting structure on which the ship is resting.

The invention has particular efficacy in the field of dry docking marine vessels and is described in detail herein in that context.

DESCRIPTION OF THE PRIOR ART

In U.S. Pat. No. 3,073,125 now expired, applicant for a patent for the present invention disclosed and claimed a dry dock which for operation was placed under a ship which lay between two quays, and was then raised by hoist winches on the quays, along with the ship, to a height which brought the ship to quay level. The dry dock included rail mounted trolleys by means of which the ship could be moved onto the quay.

U.S. Pat. No. 4,087,979 also owned by applicant and still in force, discloses and claims improvements to the dry dock of 3,073,125, inter alia by way of enabling construction in module form off site, and articulating the structure at positions along its length, so as to reduce the adverse effect of local load concentrations on the ships' hull. There are a total of one hundred and sixty eight such dry docks in operation in sixty two countries.

Both types of dry dock are operated by hoist winches which in turn are driven by a.c. synchronous motors, so as to ensure lift synchronism. Control is computerised and includes manual override.

SUMMARY OF THE INVENTION

It is an object of the present invention to provide a mode of distributing the loads experienced by a ship when on a dry dock of the kind disclosed and claimed in the aforementioned patents which should be regarded as being incorporated herein by virtue of this reference thereto.

The apparatus used in practising the method provides hoist load indicating means in the load path of each hoist winch, in a system of hoist winches on opposing quays.

The load indicating means is of the kind which generates electrical signals when acted on by a said load.

Means are provided which receive and condition the signals and further means are provided which receive the conditioned signals and use them to react upon the system and thereby control it.

The further means also uses said signals to generate visual displays of load magnitudes, current magnitudes, weight distributions and total weights, as experienced by the hoist winches.

BRIEF DESCRIPTION OF THE DRAWINGS

The invention will now be described, by way of example and with reference to the accompanying drawings in which.

DETAILED DESCRIPTION OF THE INVENTION

Figure 1:
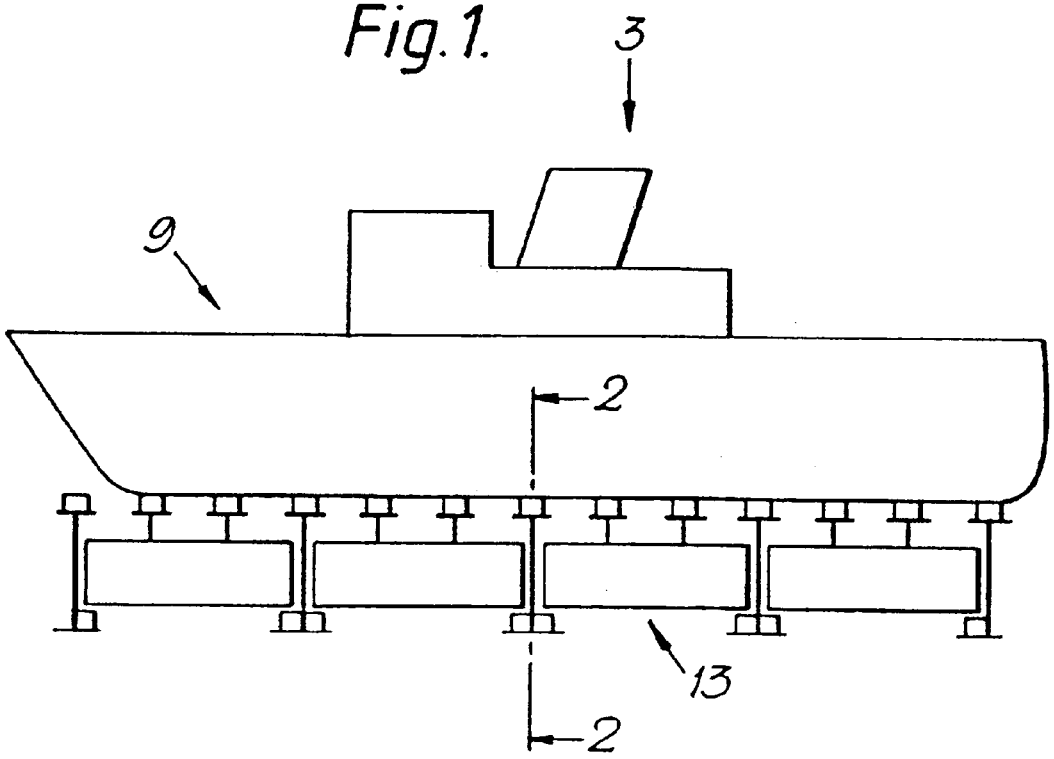
FIG. 1 is a diagrammatic side elevation of a dry dock incorporating the present invention.

Referring to FIG. 1. A platform 13 of the kind described in U.S. Pat. No. 4,087,979 supports a ship 9 for vertical movement with respect to a quay 10 (FIG. 2).

Figure 2:
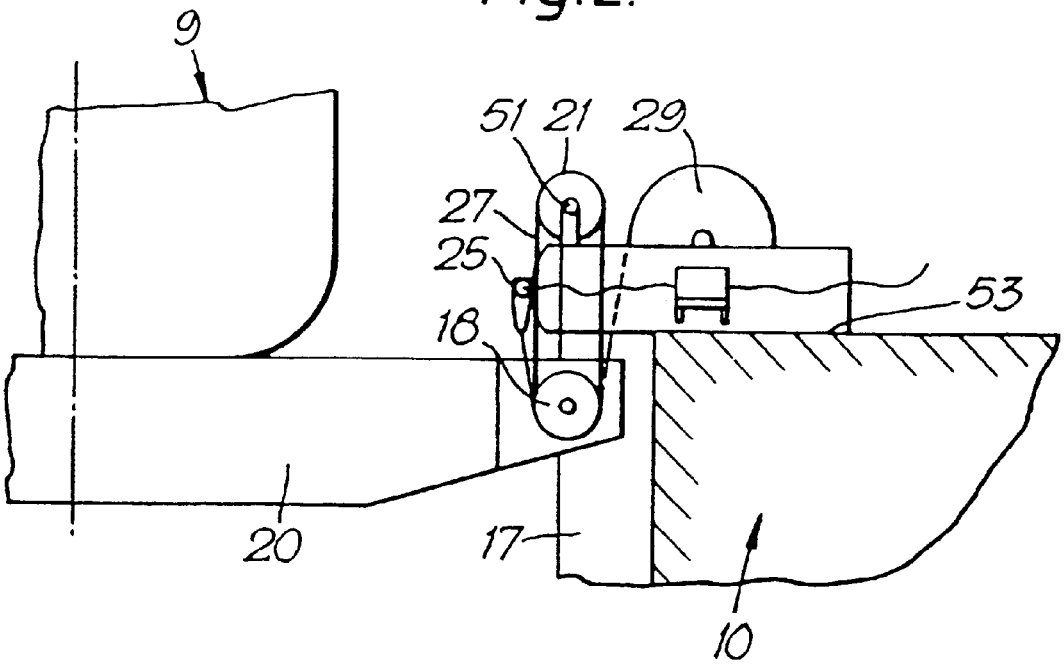
FIG. 2 is a diagrammatic view on line 2—2 of FIG. 1.

Referring now to FIG. 2. The platform 13 includes main transverse beams 20 the ends of which lie within cutouts 17 in the opposing faces of the quays 10 (FIG. 1) and 12 (FIG. 4).

The ends of the beams 20 carry sheaves 18.

Figure 4:
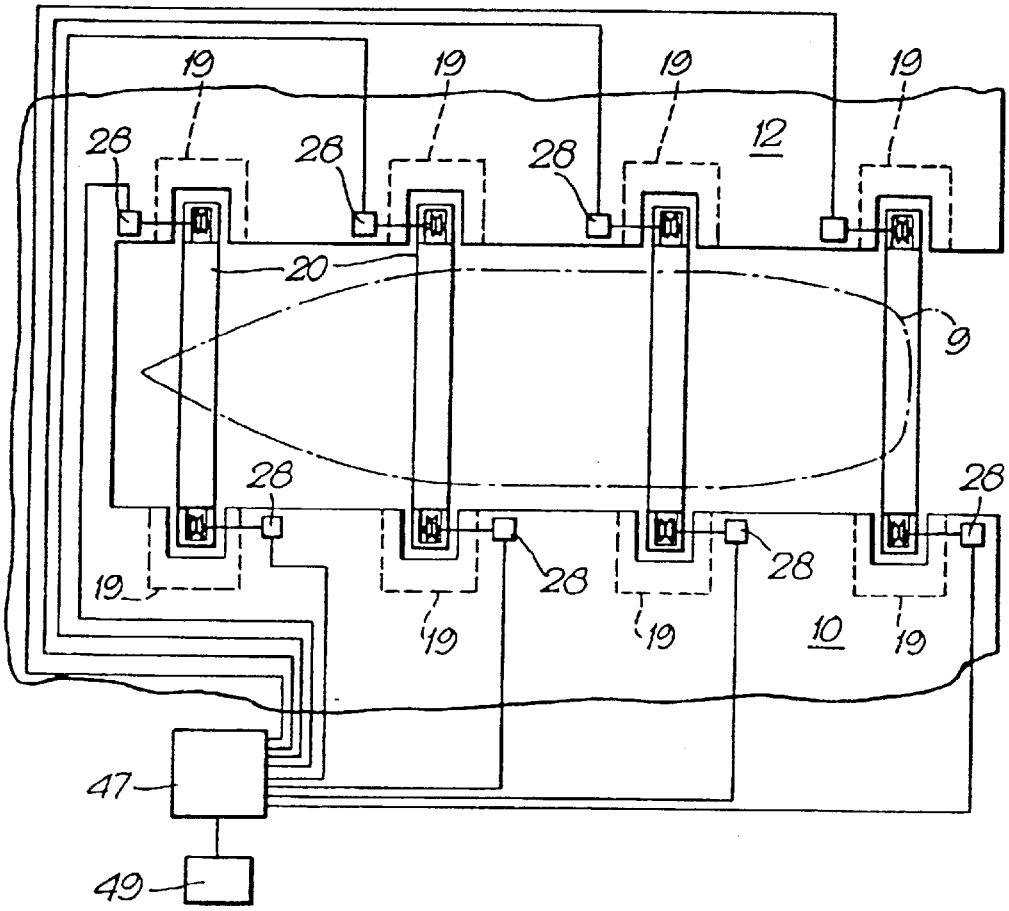
FIG. 4 is a view in the direction of arrow 4 in FIG. 1.

A hoist winch 19, one of a series of opposed pairs of hoist winches 19 as seen in in FIG. 4, is fixed to the quay and supports further sheaves 21 in approximately vertical alignment with the sheaves 18, and further includes a winch drum 29.

A wire rope 27 is fixed by one end to a load cell 25 which also doubles as a clevis pin, and which is fixed to the end of the structure of the hoist winch 19.

The rope 27 is wrapped around the sheaves 18 and 21, the remaining end finally leaving sheaves 18 and turning around the winch drum 29. A signal conditioning circuit 28 is fixed to or near the hoist winch structure 19 and is connected to the load cell clevis pin 25.

Figure 3:
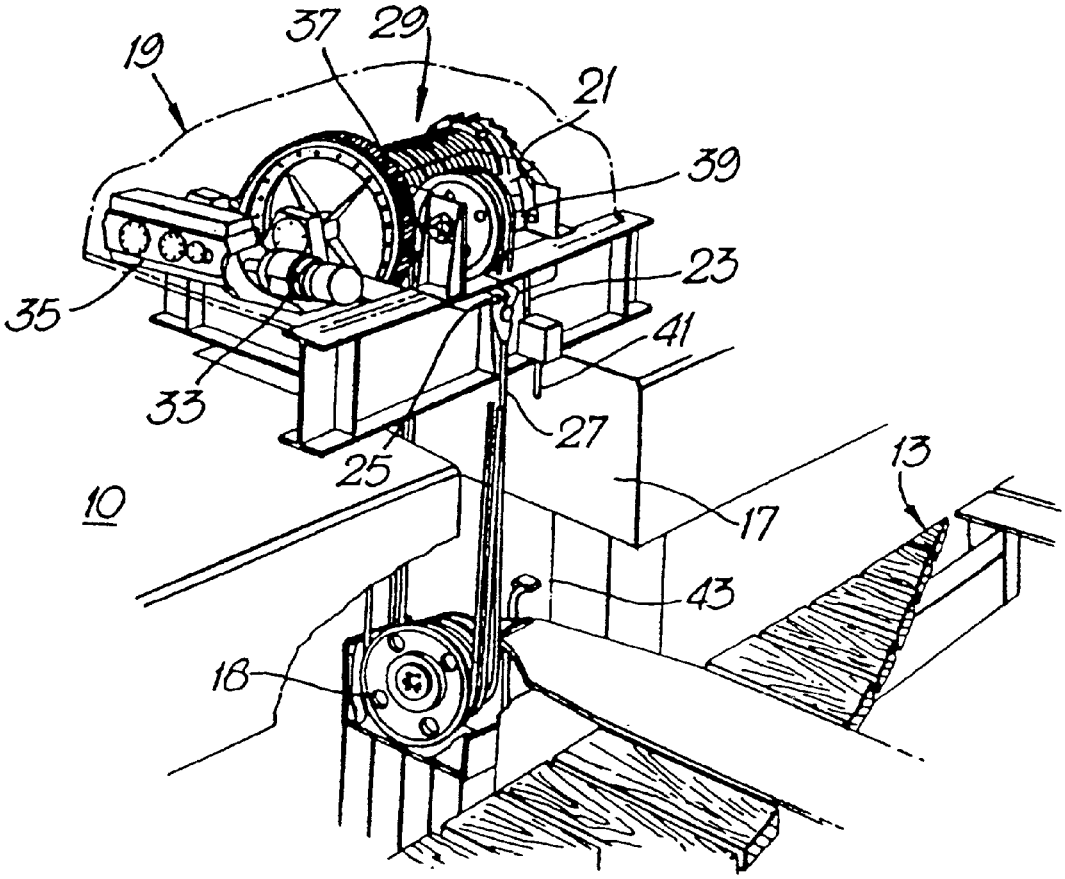
FIG. 3 is a pictorial view of a hoist winch connected for control by the present invention.

Referring now to FIG. 3. Each winch drum 29 is driven by an a.c. synchronous motor 33 via a step down gear arrangement 35 and a toothed wheel 37 on the end of the drum 29. A totally enclosed gearbox could be substituted.

A limit switch 41 is fastened to the structure of the hoist winch 19 and a contact pad 43 is carried by the beam 20. The limit switch is preset and when the platform 13 rises to its desired height during operation, the pad 43 contacts the limit switch 41 which then is actuated to effect halting of the platform [20] *13*.

Devices (not shown) within the system are utilised to determine the maximum desired lowered positions of the platform 13.

Figure 5:
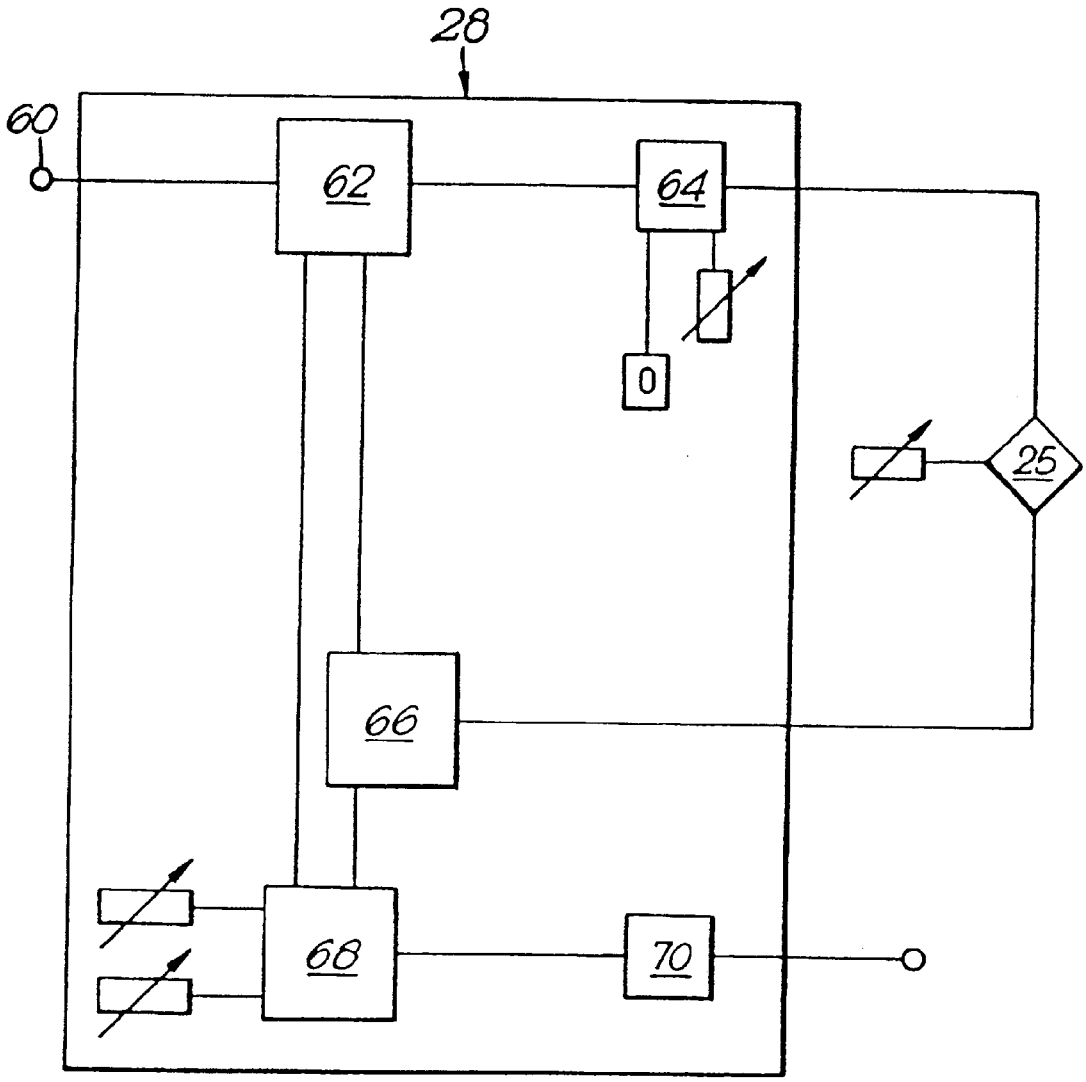
FIG. 5 is a schematic diagram of a signal conditioning circuit incorporated in the present invention.

Referring now to FIG. 4. During operation of the hoist winches 19 to raise or lower the platform 13 and its associated ship 9, the conditioning circuit 28 receives electrical signals from the load cell 25 associated with that winch 19. The circuit 28 which in FIG. 4 is depicted by a box, is more explicitly illustrated in FIG. 5 to which brief reference is now made. A d.c. input 60 is converted at 62 into a sinewave plus and minus d.c. voltage. The output from 62 is regulated at 64 and the resulting regulated, d.c. excitation voltage is passed to the load cell 25.

The output voltage from the load cell 25 is amplified at 66 and then converted at 68 to a current output for use in the computer, to which it is passed via a power handling MOSFET transducer 70.

Referring back to FIG. 4. The computer 47 sends control signals to the ship lift control panel which can stop or allow operation of the hoist winches 19 and sends further signals to a visual display unit 49 so as to display information which has been derived from the signals concerning the operating performance of the hoist winches 19, i.e. the loads being sensed and the weight of the vessel being supported.

Figure 6:
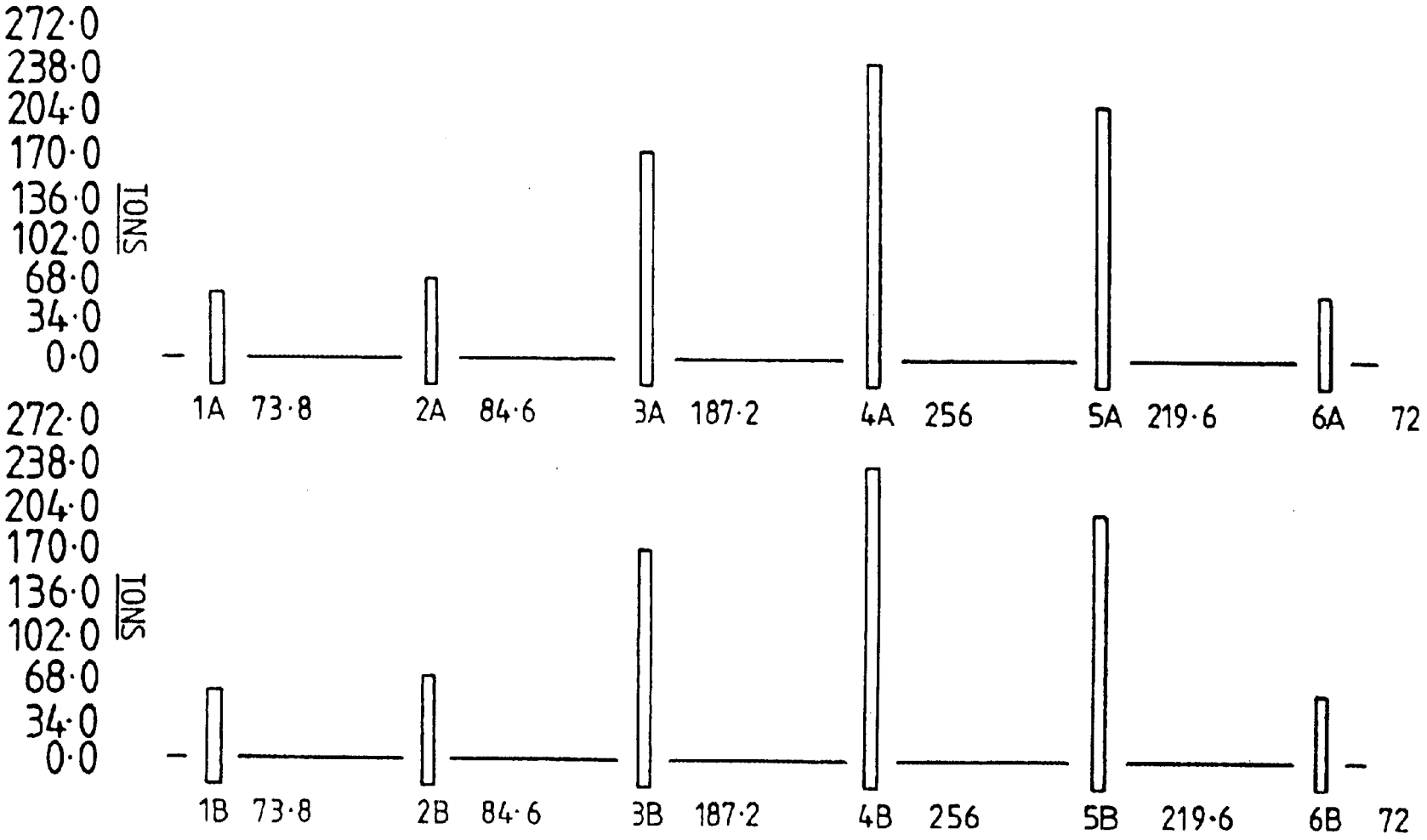
FIG. 6 is a dual graphic and actual numerical value display of a ships weight distribution in a hoist winch system incorporating six pairs of opposed winches of the kind depicted in FIG. 3.

FIG. 6 displays in both histogram and numerical form, the manner in which a particular ship's weight is distributed over the hoist winches 19. Opposed winch stations 1A and 1B are each experiencing a load of 73.8 tons. Stations 4A and 4B are each experiencing a load of 256 tons and stations 6A and 6B are each experiencing a load of 72 tons.

The foregoing description discloses the use of a load cell 25 in the form of a clevis pin. However, other forms of load cell may be used, and positioned anywhere in the load path of the loads which the hoist winches 19 experience during operation. Thus, by way of example, load cells can be positioned on the support structure 51 of the hoist winch sheaves 21, or at 53 between the hoist winches 19 and the quays 10 and 12, or at the clevis pin supports i.e. a normal clevis pin 25 is used and supported on a load cell of appropriately adapted shape.

In one example operation, the dry dock is first submerged and a ship floated over it. The hoist motors 19 are then activated in unison to raise the dock and ship to dock level, or at least to a height at which the ship is clear of the water.

Observation of the visual display indicates by way of the numerical values and the histogram whether or not the ship has been arranged symmetrically on the platform 13, with respect to the longitudinal centerline thereof. In the example, symmetrical positioning has been achieved, and as a result, opposing pairs of hoist winches 19 are indicating that they are supporting identical loads.

If the ship is skewed relative to the length of the platform, whilst it will be absolutely safe against rolling or falling off, it could result in undesirable asymmetric loads being exerted on the hull. This will shown on the visual display.

Where asymmetric loads are indicated e.g. if it is deduced from the display that the system is experiencing heavier loads on one side of the ship at a given location, then the hoist winches 19 on the heavily loaded side, either all or in part, can be lowered until the load is equalised between each opposing pair of hoists. Alternatively the hoist winches 19 on the more lightly loaded side could be raised to give the same result.

Where a high concentration of load is experienced along the vessel's length, one or more beams may be lowered at that point where the load concentration is highest so that adjacent beams can increase their share of the vessel's load.

Such a high load concentration may for example occur where a portion of the platform, or any padding structure between the ship and platform on which the hull rests, are set higher than the adjacent structure; or alternatively a high load concentration may occur where some projection from the ship's hull makes contact with the structure; alternatively high load concentrations can occur due to a number of other reasons.

When the presence of such a high load concentration is detected from information given on the display and, if it is desirable to reduce the concentration of load, one or more beams is/are lowered until adjacent beams accept a greater share of the loading. The beams are moved downwards in small increments whilst observing the changes in displayed loads at each hoist, until a more acceptable distribution of the load is achieved.

This facility also enables the Shipbuilder to induce or relieve stresses and/or strains in the hull as necessary. One benefit of this would be to allow the alignment or re-alignment of hatch openings. Alternatively, the Shipbuilder is able to adjust the supports adjacent to the stern section of a ship in order that the ship's propulsion shafts may be realigned.

Alternatively, the facility also allows the Shipbuilder to use the platform as a manipulator when joining portions of a ship's hull which may have been separated in order to perform a lengthening project or in some other form of ship conversion or new ship construction.

The articulated platform construction also allows the platform structure to be separated so that certain sections may be operated independently. This effectively converts the platform into two or more independent platforms which can be used for handling two or more vessels simultaneously. Alternatively, the facility can be used for propulsion shaft removal (where the shaft is withdrawn at a downward angle) or for removing a vessel's rudder. The operator is able to control each of these sections separately whilst observing the variation in loads on the display.

In our co-pending application Ser. No. 07/716,966 of the same filing date as this application and incorporated herein by this reference, there is described and claimed a method of weighing a ship and analysing the results. Those results enable the architect, the designer, a repairer or loadmaster, to make appropriate adjustments to structure or load prior to launch of the ship. Similarly, those same results may be used to actuate the hoist winches 19, in response to signals e.g. which indicate a need to manipulate local portions of the ship, for any of the reasons which are described herein, by way of example.

We claim:

1. A method of adjusting the distribution of loads, the magnitude of which are not accurately known and which are generated between a ship and a supporting dry dock, comprising the steps of:

a) placing the ship on a dry dock comprising a number of articulatedly joined platforms, with each said platform being suspended from a number of pairs of opposing hoist winches, and with said hoist winches comprising apparatus including means for signalling the load experienced by each one of said hoist winches, means for displaying the loads experienced by said hoist winches in accordance with said signals and means for controlling said hoist winches in accordance with said signals;

b) *automatically* activating one or more of said hoist winches relative to the remainder of said hoist winches *in response to said signals which indicate a need to manipulate local portions of the ship* to lift or lower some part of the platforms, and thereby generate an adjustment of the support provided thereby on a part of the ship's hull sufficient to cause the ship's load to be redistributed relative to at least some of said platforms to minimize an imbalance caused by the distribution of the unknown loads.

2. A method of adjusting the distribution of loads as claimed in claim 1 and including the step of activating at least one of said hoist winches on one side of the ship so as to lift or lower the corresponding sides of the platforms and so cause the load to be equalized between each pair of hoists.

3. A method of adjusting the distribution of loads as claimed in claim 1 including the step of activating at least some of said winches in unison intermittently so as to effectively increase the pressure exerted by some of said platforms against the ship's hull and thus force one or more portions of the ship into a desired shape.

4. A method of adjusting the distribution loads as claimed in claim 1 including the step of activating some of said winches so as to effect alignment of cooperating parts of the ship's structure.

* * * * *